(12) United States Patent
Olim

(10) Patent No.: US 8,346,635 B1
(45) Date of Patent: Jan. 1, 2013

(54) METHODS SYSTEMS AND COMPUTER PROGRAM PRODUCTS FOR IDENTIFYING SUSPECT DATA OF AN ELECTRONIC TAX RETURN

(75) Inventor: Moshe Olim, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 140 days.

(21) Appl. No.: 12/828,012

(22) Filed: Jun. 30, 2010

(51) Int. Cl.
*G07B 17/00* (2006.01)
*G07F 19/00* (2006.01)
*G06F 17/22* (2006.01)
*G06F 7/00* (2006.01)
*G06F 17/00* (2006.01)

(52) U.S. Cl. .............. 705/30; 705/31; 707/700

(58) Field of Classification Search .......... None
See application file for complete search history.

(56) References Cited

U.S. PATENT DOCUMENTS

| | | | |
|---|---|---|---|
| 7,742,958 B1 * | 6/2010 | Leek et al. ............... | 705/31 |
| 8,126,787 B1 * | 2/2012 | Leek et al. ............... | 705/31 |
| 2002/0111888 A1 * | 8/2002 | Stanley et al. ............ | 705/31 |
| 2005/0043998 A1 * | 2/2005 | Bross et al. .............. | 705/19 |
| 2007/0136115 A1 * | 6/2007 | Senturk Doganaksoy et al. .................. | 705/7 |
| 2009/0234684 A1 * | 9/2009 | Stoke et al. ............... | 705/7 |

* cited by examiner

*Primary Examiner* — Paul Danneman
(74) *Attorney, Agent, or Firm* — Vista IP Law Group LLP; Gary D. Lueck

(57) ABSTRACT

Identifying suspect electronic tax data of an electronic tax return prepared using a tax preparation program. A first field of the tax return is populated with first tax data. The program selects statistical data for another type of tax data based upon the first tax data. A second field is populated with second tax data, which is compared with selected statistical data to determine whether the second tax data satisfies pre-determined criteria relative to the selected statistical data, e.g., whether the second tax data is within a pre-determined range or standard deviation of a mean or average of statistical data. If the second tax data does not satisfy the criteria, e.g., is outside of the range or standard deviation, the program issues an alert to notify the preparer of the specific location of the suspect data. The alert may be issued in real time while the tax return is being prepared.

37 Claims, 23 Drawing Sheets

Enter Your W-2

410b

If you have a 1099, we'll work on that later.

I have more than one W-2 form W-2 Wage and Tax Statement

Employer Information 402

Box b Employer's Federal ID Number
EIN Explain This  [ 412k ]

Box c Employer's Name and Address    412l           402
  Location    ⦿ U.S. Address    ○ Foreign Address
  Employer's Name  [                    ]  412m
  Name, cont'd    [                    ]  412n
  Address        [                    ]  412o
  City           [                    ]  412p
  State          [         ▼]
  ZIP Code       [     ]     412q
         402    412r

FIG. 4B

| Tax Data | Form / Location |
|---|---|
| Adjusted Gross Income (AGI) | Form 1040 Line 37 |
| Charitable Contribution | Charitable Organization Worksheet - Combined Amounts Worksheet, Total |
| Mortgage Interest | Schedule A - Itemized Deductions Line 10 |
| Property Tax | Schedule A - Itemized Deductions Line 8 |
| Retirement Plan Contribution | Form 1040 Line 28 |

FIG. 5

Replacement Sheet
10/23

600 ←

404b  404c

| Adjusted Gross Income (AGI) | Charitable Contribution | Mortgage Interest Deduction | Retirement Contributions |
|---|---|---|---|
| 0-49,999 | 0-500 | 2,000-4,000 | 1,000-4,000 |
| 50,000-74,999 | 400-1,500 | 4,000-9,000 | 3,000-7,000 |
| 75,000-99,999 | 1,000-3,000 | 6,000-15,000 | 5,000-9,000 |
| 100,000-149,000 | 1,500-5,000 | 8,000-20,000 | 7,000-12,000 |
| 150,000-249,999 | 3,000-20,000 | 18,000-50,000 | 10,000-20,000 |
| 250,000-499,999 | 10,000-50,000 | 25,000-80,000 | 20,000-40,000 |

| Adjusted Gross Income (AGI) | Charitable Contribution | Mortgage Interest Deduction | Retirement Contributions |
|---|---|---|---|
| 75,000-99,999 | 1,000-3,000 | 6,000-15,000 | 5,000-9,000 |

| Adjusted Gross Income (AGI) | Charitable Contribution | Mortgage Interest Deduction | Retirement Contributions |
|---|---|---|---|
| 250,000-499,999 | 10,000-50,000 | 25,000-80,000 | 20,000-40,000 |

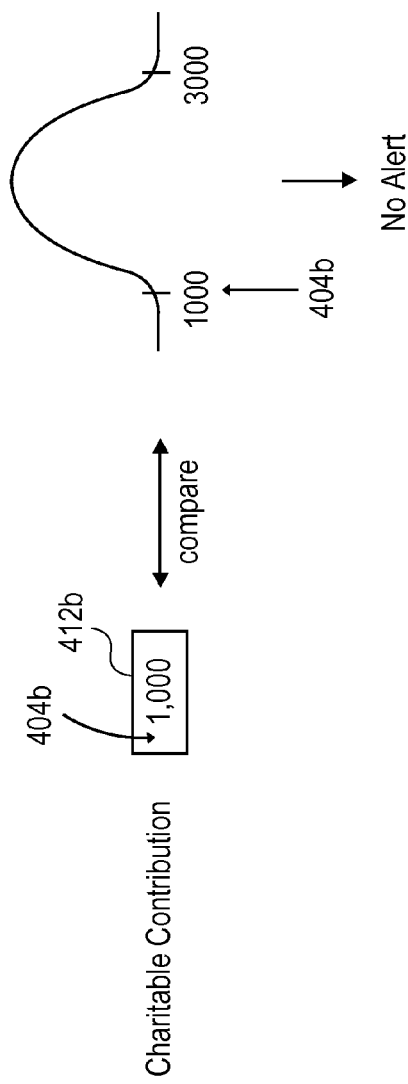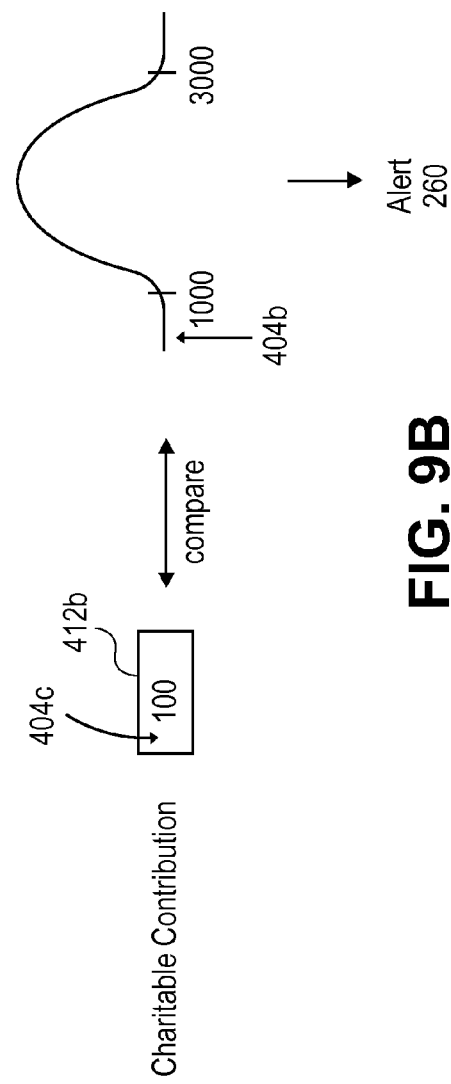

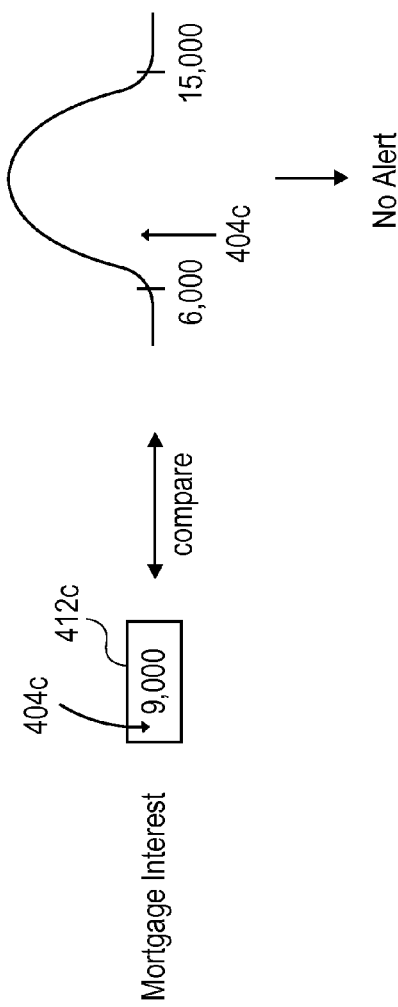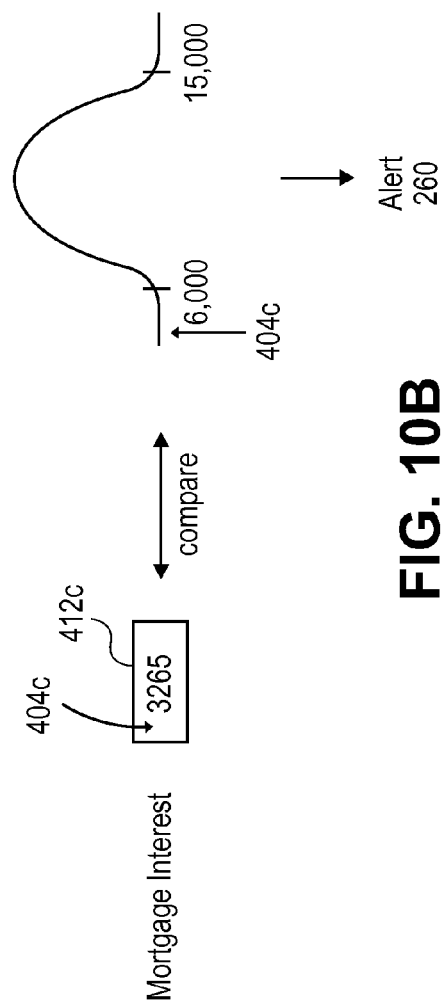

| Final Review | Audit Protection | Recommendations |

Let's Check Your Return One Last Time

We'll start by checking missed deductions or credits. Then we'll check the accuracy of your return, including missed information or other common mistakes.

Analyzing Your Return

Analysis complete.

Select Continue to see your results.

Continue

[ Final Review ]　Audit Protection　Recommendations

We Guarantee Your Maximum Refund

Good news!
We've checked every deduction and credit available for your guaranteed maximum refund.

Federal Return　　　　　　　　　　　　　　Federal Refund
Checked for federal deductions and credits　✔　3,580.00
Applied 2009 tax changes　✔
Filled out all the right forms for you　✔　[MAXIMUM GUARANTEE REFUND]

California Return　　　　　　　　　　　　　CA Refund
Checked for state deductions and credits　✔　399.00
Applied 2009 tax changes　✔
Transferred your federal info to your state　✔　[MAXIMUM GUARANTEE REFUND]
Filled out all the right forms for you　✔

Next, we'll review the accuracy of your return.

[ Back ]　　　　　　　　　　　　　　　　　　[ Continue ]

FIG. 13B

[ Final Review ]   Audit Protection   Recommendations

We've Checked Your Return For Accuracy

Good news!
Breathe easy knowing the calculations in your return are guaranteed 100% accurate. We've also check your return for missing information and common errors.

Federal Return

Checked accuracy of calculations ✔
Checked for missing information ✔
Checked for errors ✔

California Return

Checked accuracy of calculations ✔
Checked for missing information ✔
Checked for errors ✔

[ Back ]                                      [ Continue ]

FIG. 13C

Your Audit Risk Results

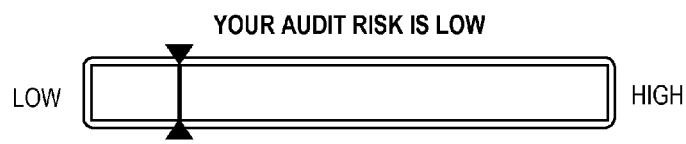

We've reviewed your return for some common situations that have historically triggered an audit. Learn More Here's what we found:

You're in good shape. Your audit risk is low, but please select Show Details to see important information associated with your audit risk analysis.

The Audit Risk Meter is designed to provide a visual indication of possible audit risk based on an analysis of some common situations in your tax return and, where possible, provide simple guidance to correct commonly audited errors. If the IRS identifies an audit trigger that falls outside of the common situations we've identified, it will not be highlighted as part of the Audit Risk Meter analysis. Additionally, the IRS selects a small percentage of returns at random for review every year. As a result, there can be no guarantee that a particular return will not be selected for audit.

FIG. 13D

METHODS SYSTEMS AND COMPUTER PROGRAM PRODUCTS FOR IDENTIFYING SUSPECT DATA OF AN ELECTRONIC TAX RETURN

BACKGROUND

The invention relates to preparation of electronic financial documents such as electronic tax returns. Tax preparation programs have become very popular and allow a user, such as an individual, taxpayer, accountant, or tax professional, to prepare and electronically file a tax return using a computer. Known tax preparation programs present a list of tax-related questions or data entry fields to the user as a series of interview screens or fillable forms, in response to which the user enters the appropriate data or answers. For example, in an individual tax return, certain interview screens or questions may involve personal and family matters such as name, address, social security number, marital status, number of dependents, etc. Other interview screens and questions may involve financial matters such as wages, retirement plan contributions, and social security, state and federal taxes paid or withheld as provided in Form-W2, charitable contributions, mortgage interest paid, property tax paid, etc. The electronic tax return may also be a business or corporate return with business related income and expense items. After entry of the data, the tax preparation application prepares an electronic tax return, which is formatted as necessary and electronically filed with a tax authority such as the Internal Revenue Service (IRS), state tax authority, or other tax collecting entity.

While tax preparation programs have been used effectively in the past to prepare and file tax returns, their effectiveness relies in part upon data input into the electronic tax return. The data, whether entered manually or imported from another program or file, may be as accurate as its source and may be inaccurate for various reasons. For example, it is not uncommon for manually entered data to be wrong for various reasons including human error, defective keyboards and issues with programs and files. Human error may involve typographical errors such as pressing the wrong number, pressing a number one too many or one to few times, pressing two keys inadvertently, inserting a comma in the wrong place, inserting a decimal point in the wrong place, or simply entering correctly typed data in the wrong field. Similar errors may be caused by computer components such as a defective keyboard that has an inoperable or sticky key and programs or files that do not operate as intended or that have corrupted data. Similar issues may arise with data that is imported from another program or file. There may also be cases in which there that tax preparation program generates errors while importing data from another program or file.

These errors, however generated, can have significant impacts on the result generated by the tax preparation program. For example, rather than an income of $75,000, a typographical error may result in an income of $750,000, which would involve substantially more tax owed. Similar results can occur with other types of errors.

While this example involves a 10× increase in income and may be identified by the preparer due to its magnitude, others errors may be more subtle and more difficult to identify while still having a significant impact on the end result, particularly if there are multiple errors. Thus, it can be difficult to pinpoint the sources of the error within an electronic tax return.

For example, an individual may be entitled to a tax deduction for a retirement plan contribution in the amount of $5000 but the individual (or another preparer such as the individual's accountant or tax professional) may inadvertently type in $500 instead or the retirement plan contribution data may be wrong for other reasons. While this error is also an 10× error, the fact that there is an error may not be readily apparent to the preparer since the reduction in taxes due to the lower amount entered may not signal to the preparer that there was an error. Thus, this error may go unnoticed, thereby resulting in a loss of a $4,500 tax deduction and more taxes paid. This not only results in loss of a potential deduction to reduce taxes, but it may also increase the risk and consequences of an audit if data of the tax return does not match data sent to the tax authority, e.g., if data of Form W-2 that includes retirement plan contribution data does not match the retirement plan contribution data of the tax return, thereby triggering further review or an audit by the tax authority.

Known tax preparation programs such as TurboTax® (available from Intuit Inc.) and other tax preparation programs conduct a final review (examples of final review screens illustrated in FIGS. 13A-C) to check for errors in a completed tax return and to assess the risk of an audit (example of audit screen shown in FIG. 13D) by a tax authority. The final review and audit check, however, are based upon tax return data entered. For example a tax preparation program such as TurboTax® may perform a final review to check for formalities such as empty fields that should be populated with data or boxes that need to be checked to ensure that no available deductions or credits were missed (e.g., if the preparer did not review certain interview screens or fill out certain sections of the tax return). Thus, while the calculations performed on the tax data may be accurate, the tax return is only as accurate as the data entered, and the tax preparation program does not analyze the data itself which is instead accepted as accurate and utilized in calculations. Consequently, the amount of tax due or the refund calculated by the tax preparation program will be based upon incorrect data if incorrect data is entered. Further, a tax preparation program such as TurboTax® may perform an audit risk assessment and generate a visual indication of audit risk as low, medium or high in the form of a bar graph. This analysis and the resulting visual representation, however, are also based upon data entered.

SUMMARY

Embodiments of the invention relate to analyzing quantifiable electronic tax data during preparation of the electronic tax return to specifically identify potential data entry errors or suspect data, e.g., by form and line number within the electronic tax return, and alerting a preparer of the tax return of the potential error or suspect data. The preparer may then review the specifically identified data and correct or verify the suspect data and continue preparation of the tax return.

With embodiments, a specific potential error or suspect data of the electronic tax return is identified by first quantifiable data being entered into the electronic tax return, selecting statistics, and comparing the selected statistics and second quantifiable data entered into the electronic tax return to determine whether the second quantifiable data is suspect or questionable data, e.g., as a result of the preparer making a typographical error, correctly typing the data but entering the data in the wrong field, or entering data of a different magnitude due to a misplaced comma, period, etc.) If the second data does not satisfy certain criteria with respect to the selected statistical data, then the tax preparation program alerts the preparer that the second data is a potential error or suspect data. The alert may be a visual and/or audio message, e.g., in the form of a message or window displayed on the screen or the field with the potential error being highlighted.

Additional data about the potential error may also be provided such that the alert explains that the second data entered is a certain amount or percentage above or below the amount of second data that most other taxpayers, who also have similar first tax data, entered in their tax returns that were already filed.

Thus, embodiments provide a cross-check mechanism that utilizes both first data from the electronic tax return and external or third party data to determine whether other data within the electronic tax return is suspect or questionable.

One embodiment is directed to a method for identifying suspect quantifiable or numerical data of an electronic tax return that is involved in a tax calculation. The method comprises receiving first quantifiable tax data and second quantifiable tax data at a computing apparatus utilized to prepare an electronic tax return with a tax preparation program. A first field of the electronic tax return is populated with the first quantifiable tax data, a second field of the electronic tax return is populated with the second quantifiable tax data. The method further comprises the tax preparation program selecting statistical data based at least in part upon the first quantifiable tax data and comparing the second quantifiable tax data and the selected statistical data to determine whether the second quantifiable tax data satisfies pre-determined criteria with respect to the selected statistical data.

A further embodiment is directed to a method for identifying suspect data of an electronic tax return and comprises selecting, with the tax preparation program, tax return statistics based at least in part upon first quantifiable tax data entered into the electronic tax return prepared utilizing a tax preparation program and comparing, with the tax preparation program, the selected tax return statistics and second quantifiable tax data entered into the electronic tax return. The tax preparation program determines whether the second quantifiable tax data satisfies pre-determined criteria with respect to the selected tax return statistics. The method further comprises alerting the preparer of the electronic tax return if the second quantifiable tax data does not satisfy pre-determined criteria with respect to the selected tax return statistics.

Another embodiment is directed to a method for identifying suspect data within an electronic financial document of a corporate or business entity. The financial document may be, for example, an electronic tax return, financial statement, quarterly or annual report, balance sheet, income statement, cash flow statement, etc. The method comprises receiving first financial data and second financial data at a computing apparatus utilized to prepare the electronic financial document. The first and second financial data are involved in a calculation as opposed to being informative data that is not involved in a calculation. A first field of the electronic financial document is populated with the first financial data, and a second field of the electronic financial document is populated with the second financial data. The method further comprises selecting statistical data based at least in part upon the first financial data. The statistical data is selected by a program utilized to prepare the electronic financial document. The method further comprises comparing the second financial data and the selected statistical data to determine whether the second financial data satisfies pre-determined criteria relative to the selected statistical data and whether the second financial data is suspect data.

Yet another embodiment is directed to a computer program product comprising a non-transitory, computer readable storage medium having instructions which, when executed by a computer system, cause a processor to execute a process for identifying suspect data of an electronic tax return. In one embodiment, the instructions are executed to receive first quantifiable tax data and second quantifiable tax data at a computing apparatus utilized to prepare an electronic tax return such that a first field of the electronic tax return being populated with the first tax data, and a second field of the electronic tax return being populated with the second tax data (e.g., by manual entry of data by a preparer of the electronic tax return or by importation of the data). The first and second quantifiable tax data are the subject of calculations. The process further comprises selecting statistical data based at least in part upon the first tax data and comparing the second tax data and the selected statistical data to determine whether the second tax data satisfies pre-determined criteria relative to the selected statistical data and whether the second tax data is suspect data.

A further embodiment is directed to a computer program product comprising a non-transitory, computer readable storage medium having instructions which, when executed by a computer system, cause a processor to execute a process for identifying suspect data of an electronic tax return. In one embodiment, the instructions are executed to select tax return statistics based at least in part upon first quantifiable tax data entered into the electronic tax return prepared utilizing a tax preparation program, compare the selected tax return statistics and second quantifiable tax data entered into the electronic tax return to determine whether the second quantifiable tax data satisfies pre-determined criteria, and if not, alerting the preparer of the electronic tax return.

Yet another embodiment is directed to a computer program product comprising a non-transitory, computer readable storage medium having instructions which, when executed by a computer system, cause a processor to execute a process for identifying suspect data of an electronic financial document of a corporate or business entity. In one embodiment, the instructions are executed to receive first quantifiable financial data and second quantifiable financial data at a computing apparatus utilized to prepare the electronic financial document. A first field of the electronic financial document is populated with the first financial data, and a second field of the electronic financial document is populated with the second financial data. The first and second financial data are involved in a calculation. The process further comprises selecting statistical data based at least in part upon the first financial data and comparing the second financial data and the selected statistical data to determine whether the second financial data satisfies pre-determined criteria with respect to the selected statistical data.

Another embodiment is directed to a system for identifying suspect data of an electronic tax return. The system comprises a tax preparation program executing on a computer and a database, which may be part of or accessible by the tax preparation program or part of or accessible by another program utilized by or with the tax preparation program. The tax preparation program can be utilized by a preparer such as an individual, accountant or tax professional to prepare an electronic tax return. The system further comprises a tax data analysis program, which may be a module or the tax preparation program or a stand-alone program that operate with the tax preparation program. The database comprises statistical data, and the tax preparation program is programmed or operable to access the database to retrieve or access statistical data. During preparation of the electronic tax return, the tax preparation program is programmed or operable to receive first and second quantifiable tax data at a computing apparatus utilized to prepare the electronic tax return. A first field of the electronic tax return is populated with the first quantifiable tax data, and the second field of the electronic tax return is populated with the second quantifiable tax data. Both the first and second data are involved in a tax calculation. The tax preparation program is programmed or configured to select statistical data based at least in part upon the first tax data, compare the second tax data and the selected statistical data to determine whether the second tax data satisfies pre-determined criteria relative to the selected statistical data to determine whether the second tax data is suspect or questionable.

Another embodiment is directed to a system for identifying suspect data of an electronic tax return. The system comprises a tax preparation program executing on a computer and a database. The tax preparation program can be utilized by a preparer such as an individual, accountant or tax professional to prepare an electronic tax return. The system further comprises a tax data analysis program, which may be a module or the tax preparation program or a stand-alone program that operate with the tax preparation program. The database comprises statistical data, and the tax preparation program is programmed or operable to access the database to retrieve or access statistical data. During preparation of the electronic tax return, the tax preparation program is programmed or operable to select tax return statistics based at least in part upon first quantifiable tax data entered into the electronic tax return prepared utilizing a tax preparation program, compare the selected tax return statistics and second quantifiable tax data entered into the electronic tax return to determine whether the second tax data satisfies pre-determined criteria, and if not, alert the preparer of the electronic tax return.

Yet another embodiment is directed to a system for identifying suspect data of an electronic financial document of a corporate or business entity. The system comprises a program executing on a computer and that is utilized to prepare the electronic financial document and a database. The system further comprises a tax data analysis program, which may be a module or the tax preparation program or a stand-alone program that operate with the tax preparation program. The database comprises statistical data, and the preparation program is programmed or operable to access the database to retrieve or access statistical data. During preparation of the electronic financial document, the preparation program is programmed or operable to receive first quantifiable financial data and second financial data at a computing apparatus utilized to prepare the electronic financial document. A first field of the electronic financial document is populated with the first quantifiable financial data, and a second field of the electronic financial document is populated with the second quantifiable financial data, both of which are involved in a tax calculation. The preparation program is further configured or operable to select statistical data based at least in part upon the first financial data and compare the second financial data and the selected statistical data to determine whether the second financial data satisfies pre-determined criteria relative to the selected statistical data and whether the second financial data is suspect.

In a single or multiple embodiments, statistical data selected by the tax preparation program for comparison with data of an electronic tax return being prepared is data from one or more of previously filed tax returns (e.g., data compiled by a tax authority with which tax returns are filed) and data stored at a remote database and utilized by the tax preparation program, e.g., from a third party who collects or analyzes tax return data based upon various criteria such as income, etc. Thus, with embodiments, upon entering first tax data, statistical data related to different, second tax data is selected from the database, which may include various types of statistical data. In a single or multiple embodiments, the particular statistical data selected depends not only on the type but also the value of the first tax data entered into the electronic tax return.

According to one embodiment, a preparer enters first tax data or first tax data is imported into an electronic tax return. The tax preparation program categorizes or determines a category or type of the first tax data. For this purpose, the tax preparation program may use a table that associates form and line numbers with types or categories of data. The preparer enters second tax data or second tax data is imported into the electronic tax return that is also categorized. Statistical data of the second category is selected based at least in part upon the first tax data of the first category, and the second tax data and the selected statistical data of the second category are compared by the tax preparation program.

For example, first quantifiable tax data may relate to income (such as adjusted gross income, investment income, rental income, or retirement income) and the second tax data may related to a deduction or tax credit (such as deductions for real estate, a dependent, a charitable donation, an education expense, a medical expense, a retirement plan contribution, etc.). Thus, income data can be used to select statistics for another type of data such as a deduction, tax credit, etc. such that the deduction, tax credit, etc. data is then compared to the selected statistics. Embodiments may also involve deduction, tax credit or other data that is utilized to select statistics, and then income data may be compared with the selected statistics. Embodiments may also involve the same category of data, e.g., entering first income data, selecting statistics for second income data, and then comparing second income data with the selected statistics. Thus, embodiments may use various types of data to select statistics, and the selected statistics may be compared with various types of data.

In a single or multiple embodiments, the statistical data comprises a range of data that is to be expected given the entered first data. This may be expressed as a certain percentage of filers with first tax data X have second tax data Y between minimum and maximum statistical values. This may also be expressed in the form of standard deviation. For example, the selected statistical values may be three standard deviations from an average or mean value of second tax data to indicate second tax data values of ~99% of other taxpayers who also have first tax data X or have first tax data X within a certain range. Thus, statistical data such as standard deviation from a mean or average, is selected based upon first data, and then compared to second data to determine whether the second data falls outside of the expected data as determined by the statistical data and is thus suspect and should be brought to the attention of the preparer.

The preparer may be alerted by a visual and/or audio message. In one embodiment, the alert is in the form of highlighting the field in which suspect tax data was entered. In another embodiment, the alert is in the form of a pop up message or window. The message may identify the specific location of the suspect data by form and line number and/or request the preparer to verify the suspect data. The preparer may be alerted immediately or shortly after the suspect data is entered and comparisons are completed during preparation of the tax return and before the tax return is completed such that the error can be completed while the preparer is on the same interview screen or section of the electronic tax return. Alerts may also be issued during a final review of a completed tax return.

BRIEF DESCRIPTION OF THE DRAWINGS

FIGS. 4A-C illustrate examples of interview screens generated by the tax preparation program and that include fields for entry of tax return data, wherein FIGS. 4A-B illustrate interview screens for entry of alpha, numeric or alpha-numeric data that is not utilized in a tax calculation, and FIG. 4C illustrates an interview screen for entry of numeric, quantifiable data to be utilized in a tax calculation;

FIG. 5 is a chart illustrating how different types of data or data fields can be related to or associated with each other according to embodiments;

FIGS. 6A-B illustrate tables that relates ranges of one type of data to ranges of other types of data, wherein FIG. 6B illustrates one embodiment in which data of ranges of adjusted gross income are related to respective ranges of different types of income tax data such as charitable contributions, mortgage interest and retirement contributions;

FIGS. 6A-D illustrate tables with statistics of different types of tax data and how statistics can be selected and compared with tax data to identify suspect or questionable data;

FIGS. 9A-C illustrate comparisons performed by a tax data analysis program in which FIG. 9A shows deduction data in the form of charitable contribution data satisfying pre-determined criteria with respect to statistical data selected based at least in part upon income data as a result of falling between lower and upper ranges of the selected statistical data, and FIG. 9B shows charitable contribution data that is suspect due to not satisfying pre-determined criteria with respect to statistical data, and FIG. 9C illustrates a message displayed to the preparer that specifically identifies the suspect data through a pop up message window;

FIGS. 10A-B illustrate comparisons performed by a tax data analysis program in which FIG. 10A shows deduction data in the form of mortgage interest data satisfying pre-determined criteria with respect to statistical data selected based at least in part upon income data as a result of falling between lower and upper ranges of the selected statistical data, and FIG. 10B shows mortgage interest data that is suspect due to not satisfying pre-determined criteria with respect to statistical data.

FIGS. 11A-B illustrate comparisons performed by a tax data analysis program in which FIG. 11A shows deduction data in the form of retirement contribution data satisfying pre-determined criteria with respect to statistical data selected based at least in part upon income data as a result of falling between lower and upper ranges of the selected statistical data, and FIG. 11B shows charitable contribution data that is suspect due to not satisfying pre-determined criteria with respect to statistical data;

FIGS. 13A-D illustrate screens displayed by a tax preparation program related to a final review to check for any missed credits or deductions and guaranteeing calculations performed on entered data and to an analysis of risk of audit.

DETAILED DESCRIPTION OF ILLUSTRATED EMBODIMENTS

Embodiments relate to notifying a preparer of an electronic financial document such as an electronic tax return of suspect or questionable numeric or quantifiable data. A preparer may be notified of suspect data at various times during preparation of an electronic tax return including in real time, e.g., after entry of suspect data. An alert is issued to the preparer to notify the preparer of the suspect data and, according to embodiments, is specific in that the alert identifies a particular field or particular data, e.g., by form and number or with another specific identification. For this purpose, embodiments identify statistical data based upon a first type or category of tax data, and compare a second type or category of tax data with the selected statistics.

Figure 1:
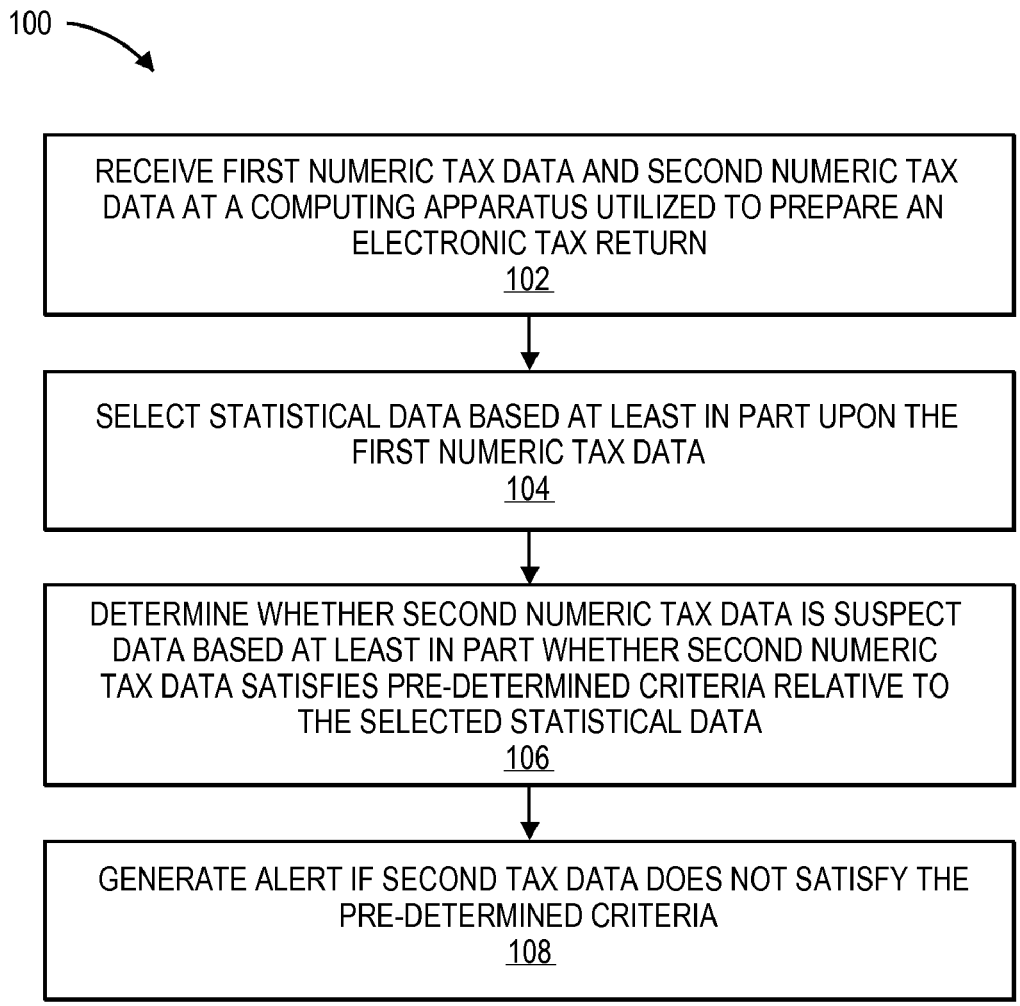
FIG. 1 is a flow chart of one embodiment of a method for analyzing electronic tax return data to identify suspect or questionable data.

For example, referring to FIG. 1, in one embodiment, a method 100 for identifying suspect data of an electronic tax return includes receiving first quantifiable, numeric tax data and second quantifiable, numeric tax data at a computing apparatus utilized to prepare an electronic tax return at step 102, and selecting statistical data based at least in part upon the first numeric tax data with the tax preparation program at step 104. At step 106, the tax preparation program determines whether second numeric tax data is suspect data based at least in part whether second numeric tax data satisfies pre-determined criteria relative to the selected statistical data, and if not, generates an alert to inform the preparer of suspect data at step 108.

Thus, with embodiments, tax return data from the electronic tax return being prepared and statistical data from an external source are utilized to identify suspect or questionable tax return data so that the preparer can verify or correct the suspect data. If data is not determined to be suspect, then embodiments are transparent to the preparer who is otherwise unaware that data being entered into the electronic tax return is being analyzed to determine whether it is suspect or questionable. Further aspects of embodiments are described with reference to FIGS. 2-12.

Figure 2:
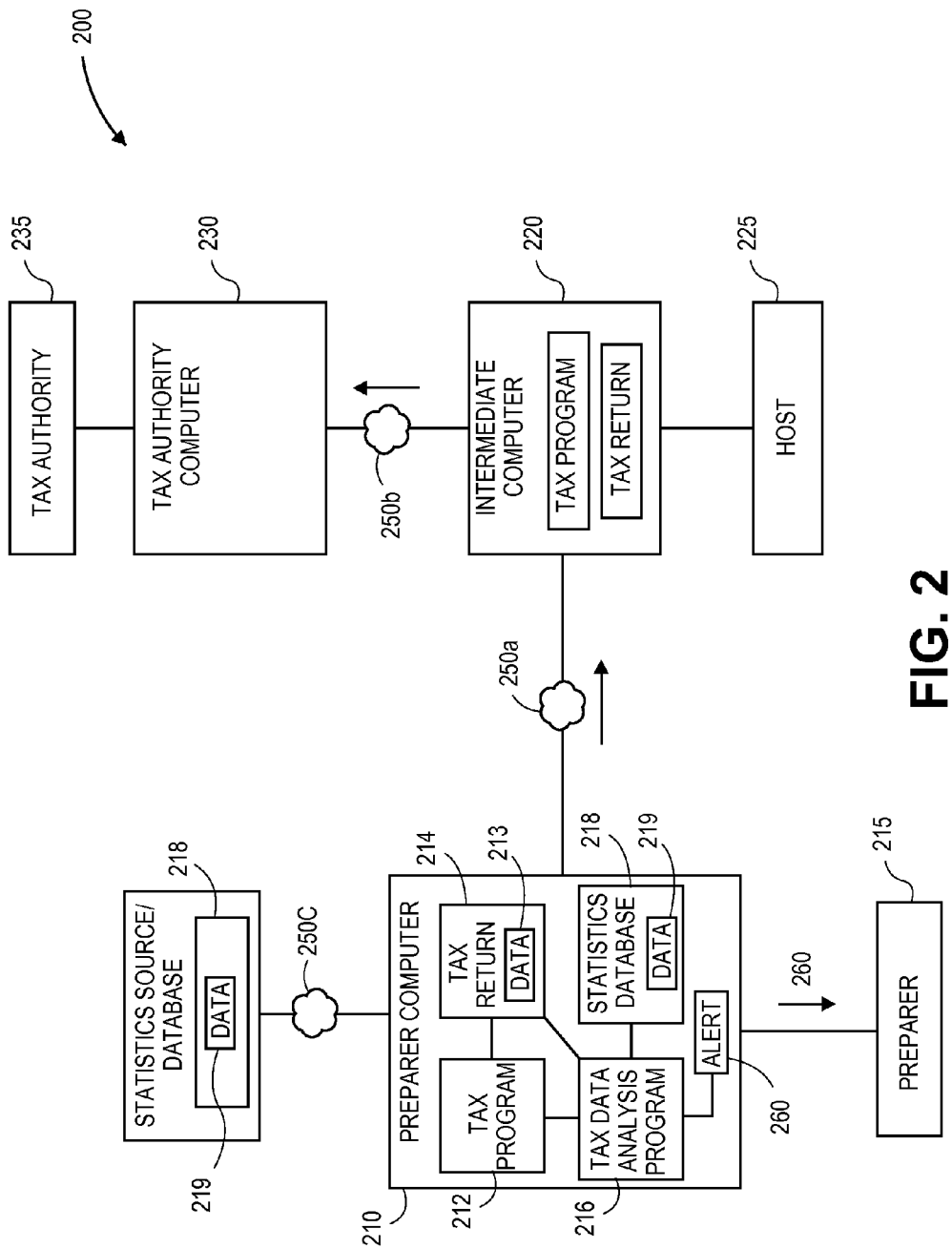
FIG. 2 is a block diagram of a system constructed according to one embodiment for analyzing electronic tax return data to identify suspect or questionable data.

Referring to FIG. 2, a system 200 constructed according to one embodiment for identifying suspect or questionable tax return data according to the embodiment illustrated in FIG. 1 and other embodiments includes or involves a first computing apparatus or computer 210 on which a tax preparation program 212 (identified as "tax program" 212 in FIG. 2) executes to prepare an electronic tax return 214 (identified as "tax return" 214 in FIG. 2) based upon tax return data 213 received at the preparer computer 210. The preparer computer 210 may a home or business computer utilized by the preparer 215 who may be an individual preparing his or her own personal tax return 214 or an accountant or a tax professional preparing a personal or corporate or business entity tax return 214. For ease of explanation, reference is made to a user or preparer 215, an electronic tax return 214 and a user or preparer computer 210, but it should be understood that embodiments may involve individuals or consumer-level tax preparation programs 212 and corporate or business entity tax returns and professional tax preparation programs 212. Examples of tax preparation programs 212 that may be programmed to incorporate embodiments or that may utilize embodiments that exist as a separate program include desktop or online versions of TURBOTAX, PROSERIES, and LACERTE, available from Intuit Inc. and other tax preparation programs 212 including, for example, programs available from Thomson Reuters, CCH and Drake Software and H&R Block TaxCut. TURBOTAX, PROSERIES AND LACERTE are registered trademarks of Intuit Inc.

According to embodiments, the preparer computer 210 further comprises or accesses a tax data analysis program 216 and a database 218 of statistical data 219. FIG. 2 illustrates the tax preparation program 212 and the tax data analysis program 216 as separate programs, but in other embodiments, the tax data analysis program 216 may be a part or module of the tax preparation program 212. Further, while FIG. 2 illustrates the tax preparation program 212, the tax data analysis program 216 and the database 218 residing on the same preparer computer 210, one or more of these system components may reside on a remote computer that is accessible by the preparer computer 210 through a network. For example, FIG. 2 illustrates a computer 240 that hosts the database 218 of statistical data 219 and that may also be operably coupled to or in communication with other sources of statistical data 219.

The system 200 may also include or involve an intermediate computer 220 managed by a host 225. The intermediate computer 220 is configured or operable to format and electronically file electronic tax returns 214 with a computer 230 of a tax authority 235, examples of which include a federal tax authority, e.g., the Internal Revenue Service (IRS), a state tax authority or other tax collecting entity of the United States, a state thereof, or another country or state thereof (generally, "tax authority"). Examples of hosts 225 that provide intermediate computers 220 for these purposes include, for example, Intuit Inc., which provides a second or intermediate computer 220 or server of the Intuit Electronic Filing Center for electronically filing tax returns 212 and other hosts 225 that provide tax preparation programs 212 and electronic filing servers.

In the illustrated embodiment, the tax preparation program 212 is a local program that executes on the preparer computer 210, but embodiments may also involve on-line tax preparation programs 212 that are hosted by a separate computing apparatus or server (not shown in FIG. 2) and accessed by the preparer computer 210 through a network using a browser or by the intermediate computer 220, which may host the tax preparation program 212, tax data analysis program 216 and/or database 218 that is accessed by the preparer computer 210. Another computer that is in communication with the preparer computer 210 may also be utilized for this purpose. For ease of explanation, reference is made generally to a tax preparation program 212, tax data analysis program 216 and database 218 on preparer computer 210, but it should be understood that one or all of these programs and database may be hosted by a remote computing apparatus and accessible through a network.

For these and other communication purposes, the preparer computer 210 is operably coupled to or in communication with the second or intermediate computer 220 through a network 250*a*, and the intermediate computer 220 is operably coupled to or in communication with the tax authority computer through a network 250*b*, and the computer 240 of the source of statistics 219 is operably coupled to or in communication with one or more other system components such the preparer computer 210 through a network 250*c*. Each of the networks 250*a-c* and other networks discussed herein (generally, network 250) may be different, or two or more networks 250 may be the same depending on the system configuration and communication protocols employed. One or more or all of the networks 250 may be, for example, a wireless or cellular network, a Local Area Network (LAN) and/or a Wide Area Network (WAN). Reference to a network 250 generally is not intended to refer to a specific network or communications protocol, and embodiments can be implemented using various networks 250 and combinations thereof.

Figure 3:
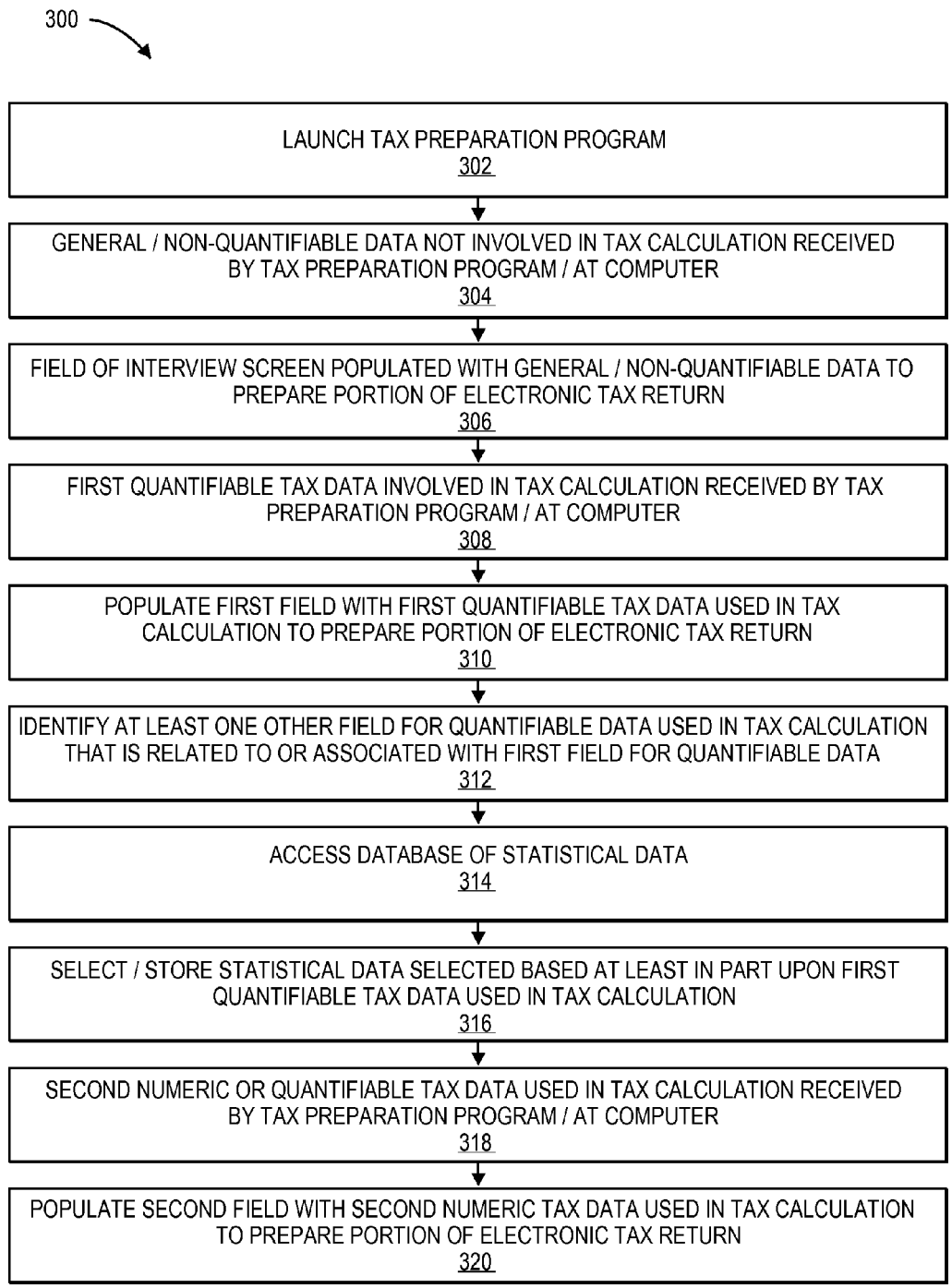
FIG. 3 is a flow chart of another embodiment of a method for analyzing electronic tax return data to identify suspect or questionable data.
Figure 3:
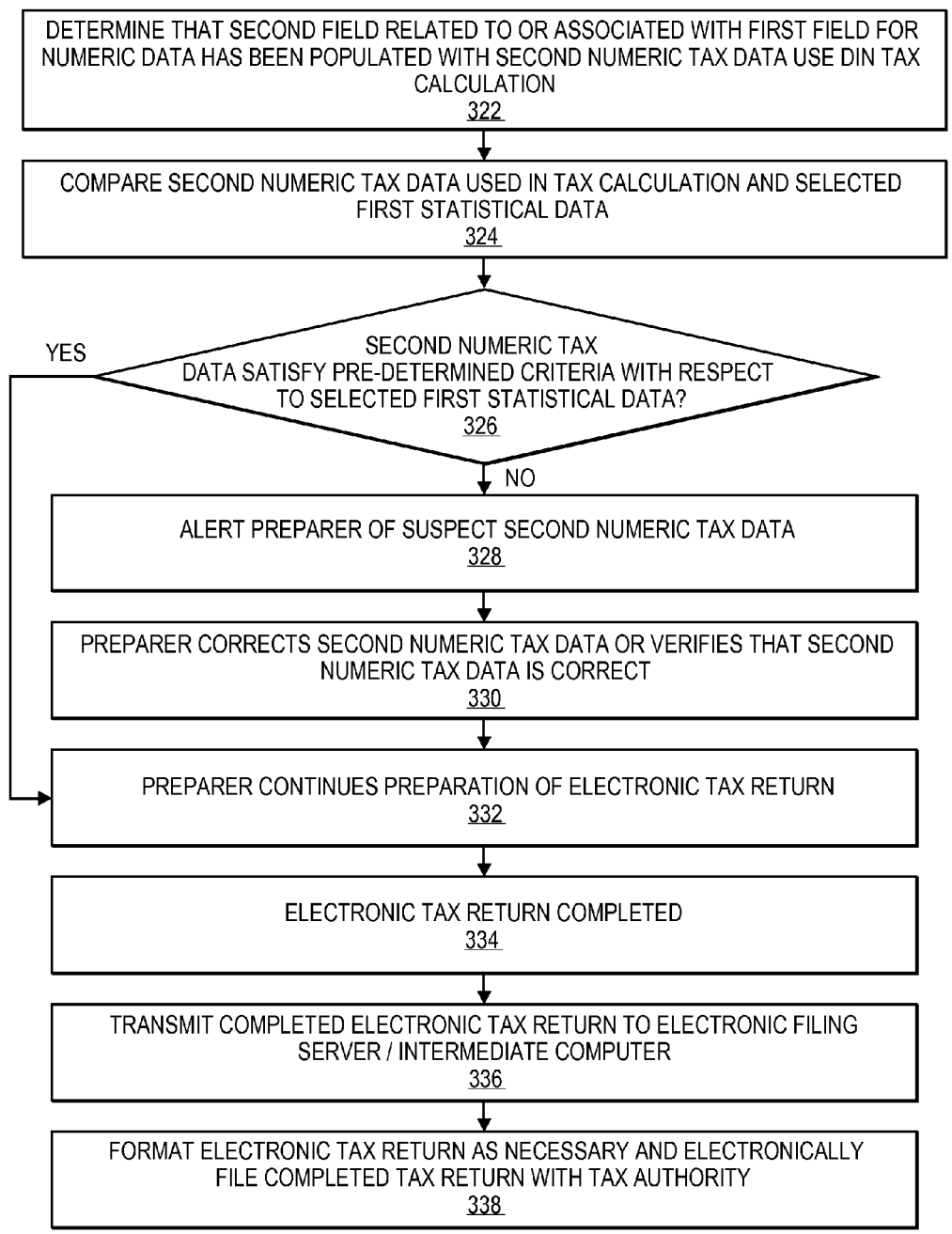

Referring to FIG. 3, one embodiment is directed to a method 300 for analyzing data 213 of an electronic tax return 214 that is involved in a tax calculation performed by the tax preparation program 212 to identify suspect or questionable data (generally, suspect data 213*s*). The method 300 comprises the preparer 215 launching the tax preparation program 212 to begin preparation of the electronic tax return 214. At steps 304-310, various tax return data 213 is received by the tax preparation program 212 at the preparer computer 210 and one or more fields of interview screens of the tax preparation program 212 are populated with received data 213.

Figure 4A:

For example, at step 304, and with further reference to FIGS. 4A-B general or non-quantifiable alpha, alpha-numeric and numeric data 402 that is not part of a tax calculation performed by the tax preparation program 212 (defined as non-quantifiable data 402) is received by the tax preparation program 212 or at the computer 215, and at step 306, one or more fields 412*a-j* (FIGS. 4*a*) and 412*k-r* (FIG. 4B) of one or more interview screens 410*a*, 410*b* generated by the tax preparation program 212 are populated with respective general or non-quantifiable data 402*a-j* and 402*k-r* (generally, 402) to prepare at least a portion of the electronic tax return 214.

Figure 4C:
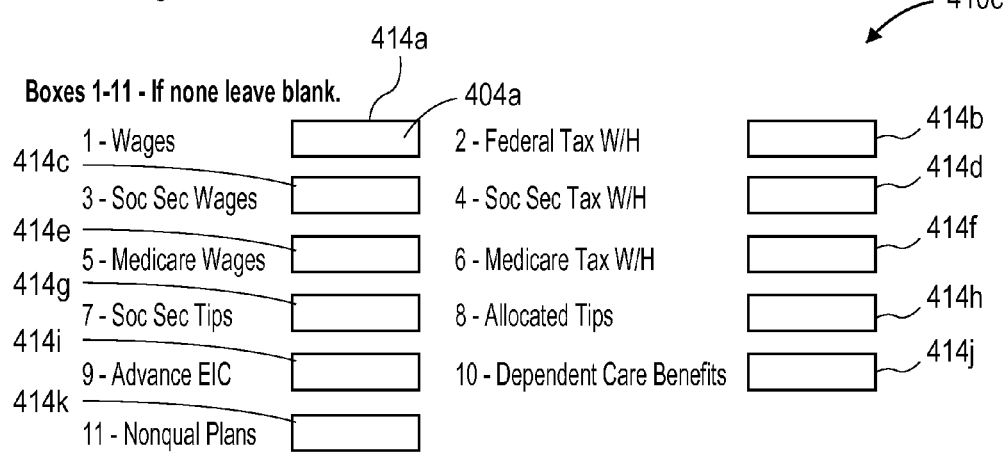

At step 308, first quantifiable, numeric tax data 404*a* is received by the tax preparation program 212 or at the preparer computer 210. With further reference to FIG. 4C, another interview screen 410 may comprise fields 414*a-k* (generally, 414) for receiving quantifiable, numeric tax data utilized in a tax calculation performed by the tax preparation program 212. The first quantifiable, numeric data 404*a* may be various types of quantifiable, numeric data involved in a tax calculation (e.g., wages 404*a* in the embodiment illustrated in FIG. 4C). Thus, quantifiable numeric data 404 is defined as being involved in a tax calculation, in contrast to general, non-quantifiable data 402, which may be numeric data that is not involved in a tax calculation. At step 310, one or more fields 414 of one or more interview screens 410 are populated with the first numeric quantifiable data 404*a* to prepare at least a portion of the electronic tax return 212.

It should be understood that steps 304-310 may be performed sequentially, simultaneously and/or in different orders depending on, for example the sequence and content of interview screens 410 and the manner in which data 213 is imported or entered into the electronic tax return 214 (e.g., manually or imported from another program or file). For example, non-quantifiable data 402 and the first quantifiable data 404*a* may be manually entered or typed into various fields 412 by the preparer 215 or imported from another program or file. Data may be imported into the electronic tax return 214 that is at least partially prepared based upon a prior filed electronic tax return prepared using the same or other tax preparation program or from a file of a personal finance program that can obtain financial and transaction data and categorize or organize the data for manipulation or analysis by a user. Examples of personal finance programs that may be utilized for this purpose include QUICKEN, QUICKEN Online, and MINT, which are also available from Intuit Inc., Microsoft Money, available from Microsoft Corporation, Redmond, Wash. and various online applications including, for example, Wasabe. QUICKEN and MINT are registered trademarks of Intuit Inc. In this case, both of the non-quantifiable data 402 and the first quantifiable data 404a may be received by the tax preparation program 212, which populates respective fields 412. Thus, the interview screen 410 examples shown in FIGS. 4A-C are provided to generally illustrate examples of interview screens 410 (which, in this illustrative example, are generated by TURBOTAX) and how different fields 412 thereof are for entry of different types of data, non-quantifiable data 402 that is not part of a tax calculation and quantifiable, and numeric data 404 that is part of a tax calculation.

Referring again to FIG. 3, at step 312, the tax data analysis program 216 identifies another field 412b within the same or other interview screen 410 or identifies another, second type or category of numeric or quantifiable data 404b that is used in a tax calculation and related to or associated with the first numeric or quantifiable data 404a. For this purpose, the first quantifiable data 404a can be categorized or sub-categorized as necessary, e.g., "wages" can be categorized to be an element of "income" or "adjusted gross income" and a retirement plan contribution can be categorized to be an element of a "deduction," etc. It should be understood that other types of tax return data 213 can be categorized accordingly and related or associated with each other, and other categories may be utilized.

With further reference to FIG. 5, the method 300 further comprises step 312 of identifying one or more other fields 412b or other quantifiable, numeric data 404b related to or associated with the first field 412a for the first quantifiable tax data 404a. For example, as shown in FIG. 5, the tax data analysis program 216 may have or access various tables 500 linking or associating types of data used in tax calculations and their respective fields 412 of various interview screens 410. In the illustrated embodiment, the table 500 identifies types or categories 502 of data and their respective locations 504, e.g., tax form and line numbers or interview screen 410 locations.

Thus, for example, types or categories of quantifiable tax data 404 such as adjusted gross income ("AGI"), charitable contributions, mortgage interest, and retirement plan contributions, all of which are involved in tax calculations, may be related to each other. The determination of which types of quantifiable data 404 are related to each other may be made by the source or manufacturer of the tax preparation program 212 or tax data analysis program 216, the tax authority 135, and/or the preparer 215. Further, while embodiments are described with reference to identifying other types of data related to a first quantifiable data 404a in the form of AGI, embodiments may involve different types of first quantifiable data 404a, and such associations may be made or identified by the source or manufacturer, tax authority 135 and/or preparer 125 at various times including before any data is received to begin preparation of the electronic tax return 214 or during preparation of the electronic tax return 214 (e.g., at step 312, which may occur before or after steps 304-310).

Referring again to FIG. 3, at step 314, the tax data analysis program 216 accesses the database 218 to retrieve or access statistical data 219 of the related types or categories of quantifiable data 404, which may be stored in a database 219, memory or file of a remote computer 240 or at the preparer computer 210 at step 316.

Figure 6A:
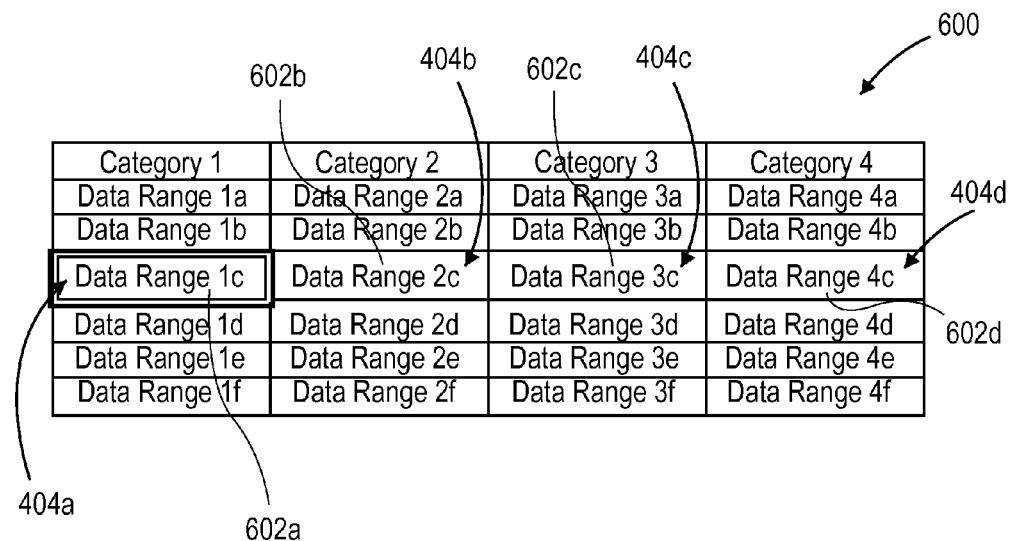

For example, referring to FIGS. 6A-B, and continuing with the example above, the tax data analysis program 216 may retrieve statistical data in the form of a table 600 that includes various ranges of statistical data. As generally illustrated in FIG. 6A, the table 600 shows, for example, that most tax filers having quantifiable tax data 404a of Type 1 or Category 1 within a range 1C 602a usually have quantifiable tax data 404b of Type 2 or Category 2 within a range 2C 602b, quantifiable tax data 404c of Type 3 or Category 3 within a range 3C 602c, and quantifiable tax data 404d of Type 4 or Category 4 within a range 4C 602d.

FIG. 6B illustrates one example in that involves types of quantifiable data 404a-d including AGI, charitable contributions, mortgage interest deductions and retirement contributions. Thus, in the illustrated embodiment, quantifiable data 404a of one type of income is related to or associated with quantifiable data 404b-d of one or more deductions. In the illustrated embodiment, columns are for the four different types of quantifiable data 404a-d, and each of the six rows includes related ranges 602 of the different types of quantifiable data 404. Thus, ranges of income such as AGI are related to or associated with respective ranges of deductions such as charitable contributions, mortgage interest, and retirement plan contributions in the illustrated example.

With the statistics table 600 shown in FIG. 6B, if the first quantifiable tax data 404a used in a tax calculation is an AGI amount between 75,000 and 99,000, statistics for this particular range of AGI may be selected 610 as shown in FIG. 6C, and the selected statistics table 610a indicates that, based on statistical data 219, most filers having AGIs ranging between 75,000 and 99,999 also have charitable contributions between 1,000 and 3,000, mortgage interest between 6,000 and 15,000 and retirement contributions between 5,000 and 9,000. Of course, the actual statistical data may vary, and these numbers are provided as examples to explain how embodiments may be implemented. As another example, referring to FIGS. 6D, if the first quantifiable data 404a is instead an AGI amount between 250,000 and 499,999, then the selected statistics table 610b indicates that most filers having these incomes have charitable contributions between 10,000 and 50,000, mortgage interest deductions between $25,000 and $80,000 and retirement contributions between 20,000 and 40,000. Thus, the tables 600, 610, 620 shown in FIGS. 6A-D serve to identify related types of quantifiable tax data and their respective statistical data or ranges for a given value of first quantifiable tax data which, in the example described above, is AGI. Embodiments, however, may involve other types of first quantifiable data 404a besides AGI and other types and ranges of tax return data related or associated with the other types of first quantifiable tax data 404a.

Thus, while FIGS. 6A-D illustrate tables with various ranges of different types of data used in tax calculations, embodiments may involve various types of quantifiable data 404 including, but not limited to, income, deductions and/or tax credits. Further, it should be understood that embodiments may involve analysis of each type of quantifiable data 404 or only certain types of quantifiable data 404. For example, while the above example involves AGI, charitable contributions, mortgage interest and retirement contributions, other types of quantifiable data 404 may not be analyzed for various reasons including the selection or preference of the source of the tax preparation program 212 or tax data analysis program 216, the lack of statistics on that type of data, or preparer 215 preference. Further, it should be understood that while FIGS. 6A-B illustrate four types of data and six ranges thereof, embodiments may involve different numbers of data types and ranges. Moreover, while FIGS. 6A-D illustrate an embodiment involving one type of income (AGI) and three types of deductions (charitable contribution, mortgage interest, retirement plan contribution), embodiments may involve one type of deduction and multiple types of income or multiple types of income and multiple types of deductions. Further, the "income" and "deduction" categories and sub-categories or types of data thereof are provided as illustrative examples of how embodiments may be implemented. Additionally, embodiments may involve income, deductions, other categories, and combinations thereof.

Statistical data 219 used to create the table 610 may be received from various sources of tax data including, but not limited to, one or more tax authorities 135, which collect data of a plurality of filed tax returns, the host 125, which may collect or receive tax data statistics from various sources including the tax authority 135, or another source such as a financial or tax journal or publication (e.g., Kiplinger's, Fortune, etc.) that collects and provides or publishes tax statistics 219. The database 218 may be local, e.g., part of the tax preparation program 212 or tax data analysis program 216, or the database 218 may be stored on a remote server 240 (e.g., as shown in FIG. 2) that is accessed by the preparer computer 110 through a network 250a.

Figure 7:
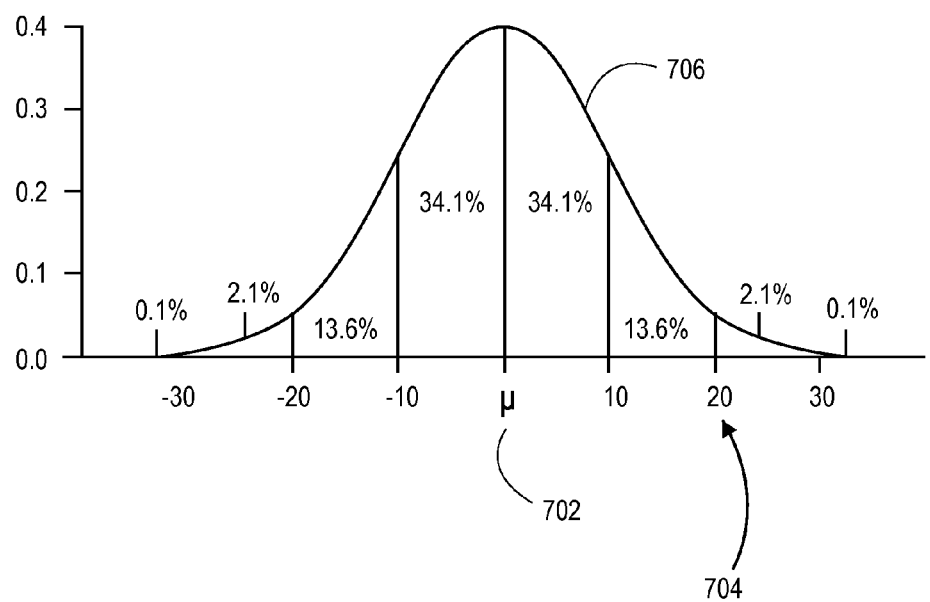
FIG. 7 generally illustrates a curve illustrating how statistical data utilized in embodiment scan be represented as a certain number of standard deviations from a mean.

The statistical data 219 can also be expressed in different ways and represent different numbers of tax filers. For example, in the illustrated embodiment, the statistical data 219 is expressed in terms of a range of statistical values having a minimum value and a maximum value, and these ranges may represent 70%, 80%, 90%, 95% and other percentages of other filers depending on the accuracy of the statistical data 219. Further, referring to FIG. 7, statistical data 219 may be expressed in terms of a mean value ($\mu$) 702 and one or more standard deviations ($\sigma$) 704 relative to that mean value 702. As shown in FIG. 7, a set of statistical data 219 may have a mean value 702 and be expressed in the form of a normal distribution or bell curve 706 such that the number of filers having certain data can be expressed in terms of standard deviations 704 relative to the mean 702.

For example, the statistical data 219 may indicate that filers with a certain range of wages or AGIs typically have a mean or average charitable contribution amount of $6 k with a standard deviation of 1 k (such that, e.g., about 68% of filers with these income levels have charitable contributions between 5-7 k) and two standard deviations of 2 k (such that, e.g., about 95% of filers with these incomes have charitable contributions between 4-8 k), and three standard deviations of 2.5 k (such that, e.g., about 99% of filers with these incomes have charitable contributions between 3.5-8.5 k). It should be understood that embodiments may be implemented using various types, sources and expressions of statistical data 219, and that the types, associations and expressions of statistical data 219 provided above are illustrative examples of how embodiments may be implemented. The number of standard deviations 704 utilized may depend on the desired confidence in the statistical data 219, and according to one embodiment, three standard deviations ($3\sigma$) 704 are utilized such that the statistical data encompasses ~99% of all tax filers.

Referring again to FIG. 3, at step 318, second numeric or quantifiable tax data 404b is received by the tax preparation program 212 or at the preparer computer 210, and at step 320, a second field 414b for quantifiable data is populated with the received second quantifiable tax data 404b to prepare portion of electronic tax return 214. At step 322, if the second field 414b populated at step 320 is related to or associated with the previously populated first field 414a for quantifiable data 404, then the tax data analysis program 216 determines that the second field 414b is related to another populated field 414a for quantifiable data and has been populated with quantifiable data. For this purpose, fields 414 for quantifiable data 404 can be identified as such (e.g., within the tax preparation program 212 or the tax data analysis program 216) and/or utilizing tables shown in FIGS. 6A-D.

At step 324, the tax data analysis program 216 compares second quantifiable 404b data and the selected first statistical data 610, and at step 326, determines whether the second quantifiable tax data 404b satisfies pre-determined criteria with respect to selected statistical data 610, which was selected based at least in part upon the previously entered first quantifiable data 404a. In the illustrated embodiment involving a range of statistical data, the predetermined criteria may be whether the second quantifiable data 404b falls within the range. If not, then at step 328, the tax data analysis program 216 may generate an alert 260 to inform the preparer that the second quantifiable data 404b is questionable or suspect data 213s. The alert 260 may be in the form of a pop-up message or window or highlighting the field containing the suspect data 213s. At step 330, the preparer 215 can then correct the suspect data 213s or verify that it is correct, and in either case, at step 332 (and if the second quantifiable data 404b satisfies the pre-determined criteria), the preparer 215 continues preparation of electronic tax return 214.

If during step 330, the preparer 215 enters new second numeric tax data to correct the previously entered data, the tax data analysis program 216 may again compare the new data to the selected statistics, and if the new data does not satisfy the pre-determined criteria (e.g. due to a further data entry error), the tax data analysis program 216 may again alert 260 the preparer 215. Further, if additional or third quantifiable data 404c-n related to or associated with the first quantifiable data 404a is entered into the electronic tax return 214, comparisons of the third or other quantifiable data 404c-n and respective selected statistical data 610 can be performed to determine whether the third or other quantifiable data 404c-n satisfies the predetermined criteria or whether it is suspect data 213s.

At stage 334, the electronic tax return 214 is completed, the statistical cross-checks are completed, suspect data 213s is verified and/or corrected, the final review for missing data or missing deductions is completed, and the audit check is completed by the tax preparation program 212. At step 336, the completed electronic tax return 214 is transmitted from the preparer computer 210 to the intermediate computer 202, which may be an electronic filing system or server that coordinates electronic filing of the completed tax return 214. The electronic tax return 214 is formatted and checked as necessary by the intermediate computer 220 and at stage 338, electronically filed with the tax authority computer 230. Further aspects of embodiment and examples of how embodiments may be implemented are described in further detail with reference to FIGS. 8A-11C.

Referring to FIGS. 8A, and referring again to the selected statistical data 610 of FIG. 6C, one example involves the first quantifiable data 404a being AGI 802 and selected statistics related to AGI (represented by bi-directional arrows) including charitable contribution 804, mortgage interest deduction 806 and retirement account contributions 808 such that statistics of the charitable contribution, mortgage interest and retirement contribution are selected 610 based on the entered AGI such that when data of the charitable contribution, mortgage interest and retirement contribution are entered, they are compared to respective selected statistics 610 to determine whether the charitable contribution, mortgage interest and retirement contribution data are suspect data 123s.

Figure 8A:
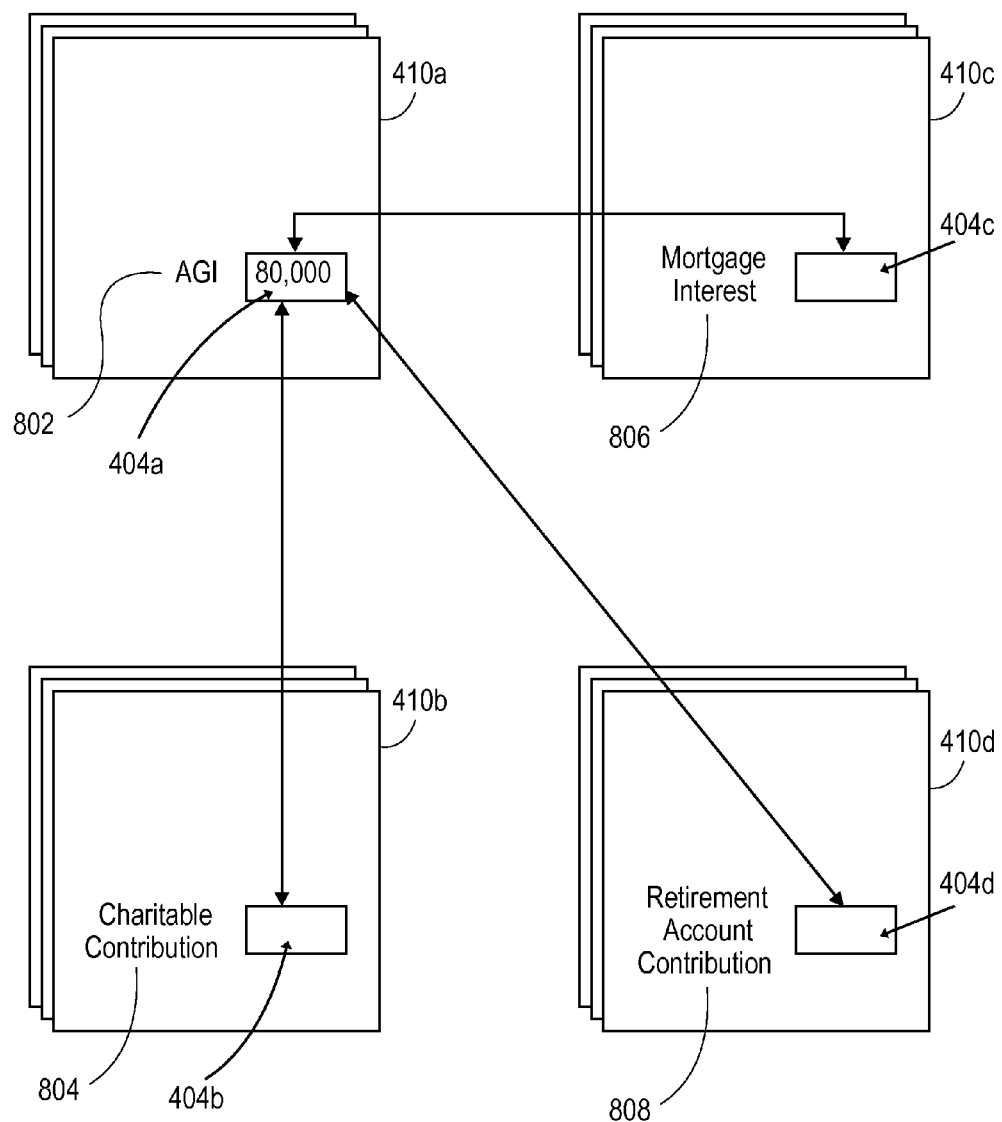
FIGS. 8A-D illustrate how income data can be related or associated with deduction data, and how statistics related to deduction data can be selected based at least in part upon the income data such that a comparison of deduction data and selected statistics can be performed.
Figure 8B:
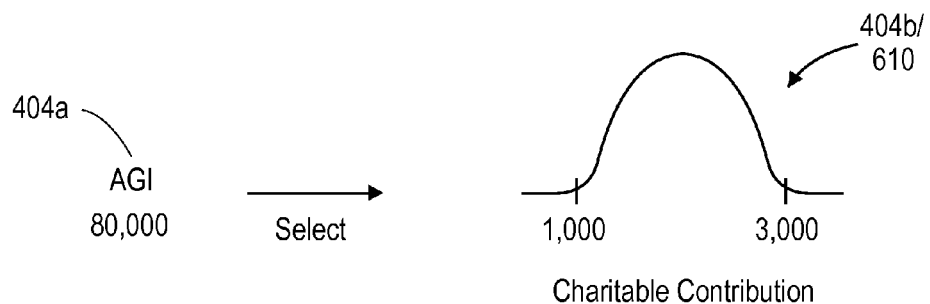
Figure 8C:
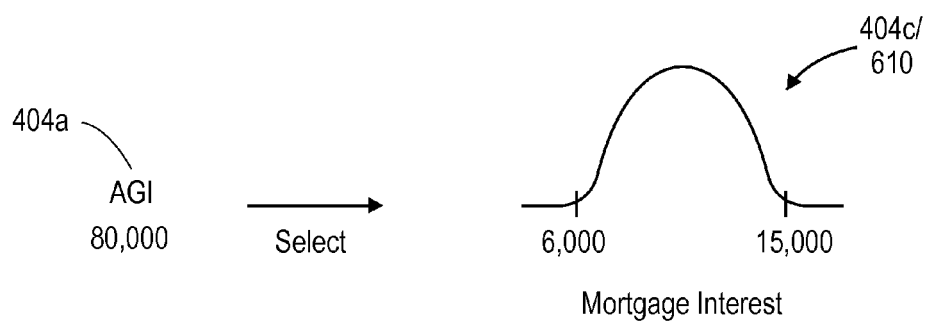
Figure 8D:
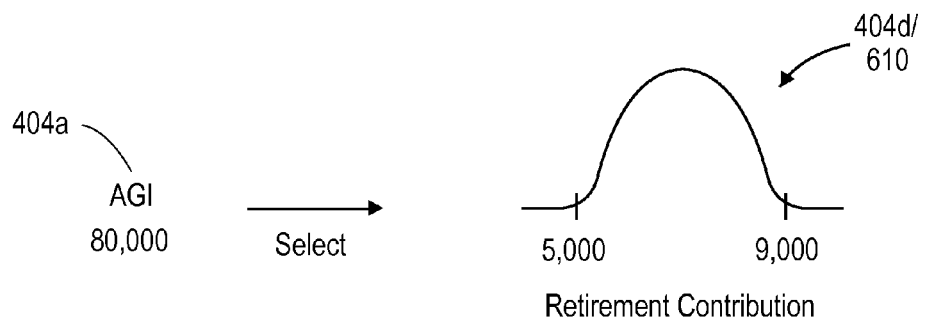

In the illustrated example, the AGI income value entered into the AGI field is 80,000, which is within the range of 75,000 and 99,999 (FIG. 6C), and statistics for this AGI show that most (e.g., based on a certain percentage or standard deviation determination) filers having an AGI within the same range had a charitable contribution deduction value between 1,000 and 3,000 (FIG. 8B illustrating a curve representing charitable deduction values), a mortgage interest deduction between 6,000 and 15,000 (FIG. 8C illustrating a curve representing mortgage interest values) and a retirement contribution (e.g., 401k, IRA, etc.) between 5,000 and 9,000 (FIG. 8D illustrating a curve representing charitable deduction values).

Referring to FIGS. 9A-B, when the charitable contribution amount 404b is entered into a field 414b, the entered charitable contribution amount 404b is compared to the charitable contribution statistics selected based upon the AGI. Thus, as shown in FIG. 9A, if the charitable contribution amount 404b is $1,000 (represented by vertical arrow), then this falls within the selected range of 1,000 to 3,000 such that this charitable contribution amount 404b is not suspect or questionable, and no alert 260 or other action is initiated by the tax data analysis program 216. Thus, the analysis is transparent to the preparer 215.

However, as shown in FIG. 9B, if the charitable contribution amount 404b is $100 (represented by vertical arrow), e.g., due to a typographical or other error by the preparer when it was intended to enter $1,000 instead, then this amount falls outside of the selected range of 1,000 to 3,000 such that this charitable contribution amount 404b is determined by the tax data analysis program 216 to be suspect data 213s.

Figure 9C:
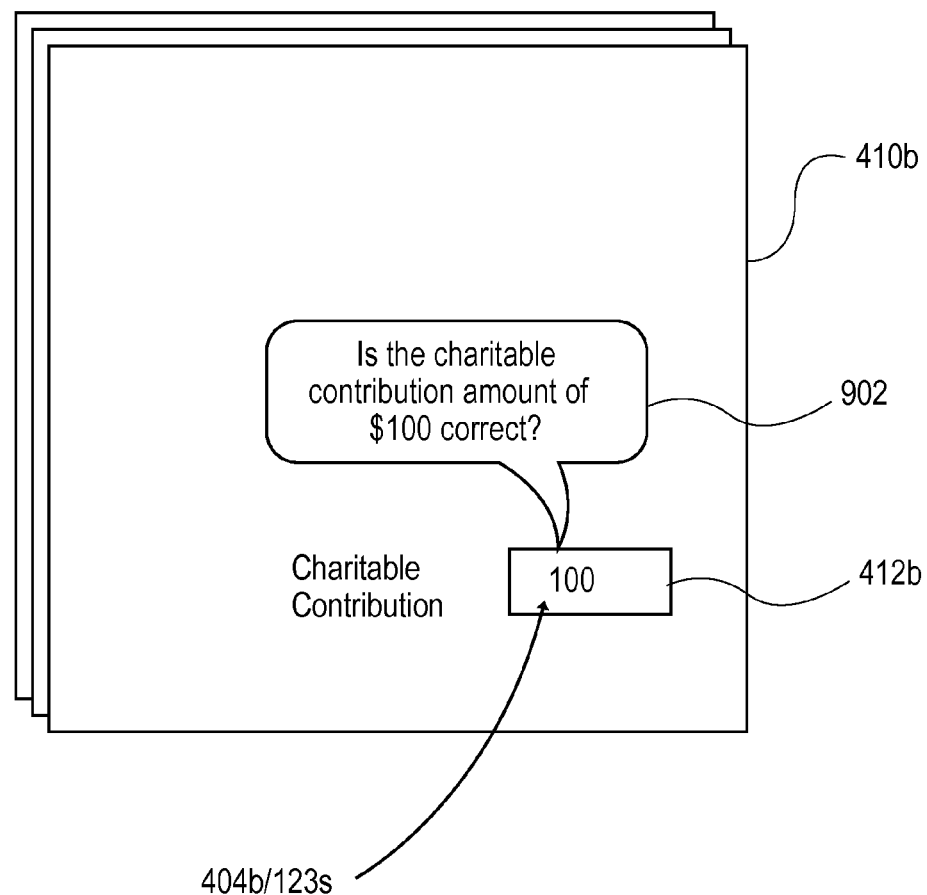

Referring to FIG. 9C, in the case of suspect data 213s, the tax data analysis program 216 may generate a pop-up window message 902 alerting the preparer 215 of the suspect data 123s with specificity such that the preparer 125 is aware of the particular data that is suspect and/or the form and line number of the suspect data 123s. The message 902 may ask whether the entered amount 404b is correct or for the preparer 125 to verify the amount. Further, the message 902 may inform the preparer 125 that the charitable contribution amount 404b that was entered is $100, but most taxpayers having a similar AGI have a charitable contribution between 1,000 and 3,000. Embodiments may involve various types of messages 902 that may be displayed at various times during preparation of the electronic tax return 214. According to one embodiment, the message 902 is generated and displayed in real-time during preparation of the electronic tax return 214 such that the suspect data 123s is identified while the preparer 125 is on the same interview screen 410 (e.g., as shown in FIG. 9C). According to another embodiment, suspect data 123s issues can be compiled in a report that is displayed to the preparer 125 during a statistics check, which may follow completion of the electronic tax return 124 that is separate from and considers different data compared to the standard final review and audit check (FIGS. 13A-D).

Figure 10C:
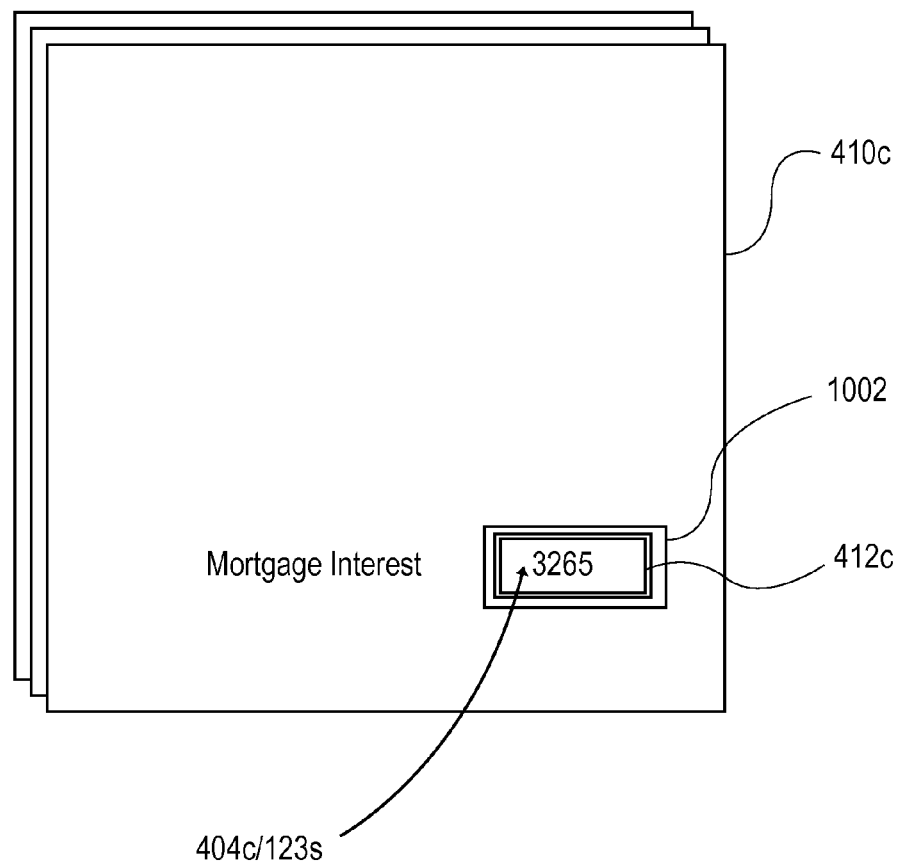
FIG. 10C illustrates a field containing the suspect data being highlighted in order to specifically identify the suspect data.

Referring to FIGS. 10A-C, a similar analysis can be performed on the mortgage interest data. Referring to FIG. 10A, if the mortgage interest amount is $9,000, then this falls within the selected statistical range of 6,000 to 15,000 such that this mortgage interest amount is not suspect or questionable, and no alert or other action is initiated by the tax data analysis program. Thus, the analysis is transparent to the preparer.

However, as shown in FIG. 10B, if the mortgage amount is $3265 (e.g., due to a data entry or import error), then this falls outside of the selected range of 6,000 to 15,000 such that this mortgage interest amount 404c is determined by the tax data analysis program to be suspect data 123c. In this case, the tax data analysis program 116 may generate a pop-up window message 902 (as described with reference to FIG. 9C) alerting the preparer 125 of the suspect data 123s with specificity such that the preparer 125 is aware of the potential error.

In an alternative embodiment, as shown in FIG. 10C, the field 414c containing the suspect mortgage interest data may be highlighted or emphasized 1002 (e.g. by shape, color, effect, etc.) to inform the preparer that this data is suspect 123s. According to one embodiment, the field 414c or suspect data 123s can be highlighted or emphasized 1002 in real-time during preparation of the electronic tax return 124 such that the suspect data 123s is identified while the preparer 125 is on the same interview screen 410c (as shown in FIG. 10C). According to another embodiment, the field or suspect data can be highlighted 1002 during a statistics check following completion of the electronic tax return 124 that is separate from and considers different data compared to the standard final review and audit check (FIGS. 13A-D).

Figure 11A:
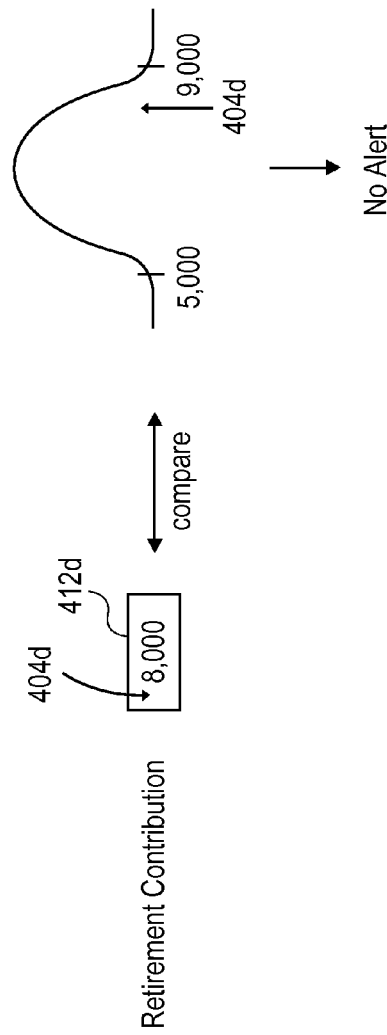
Figure 11B:
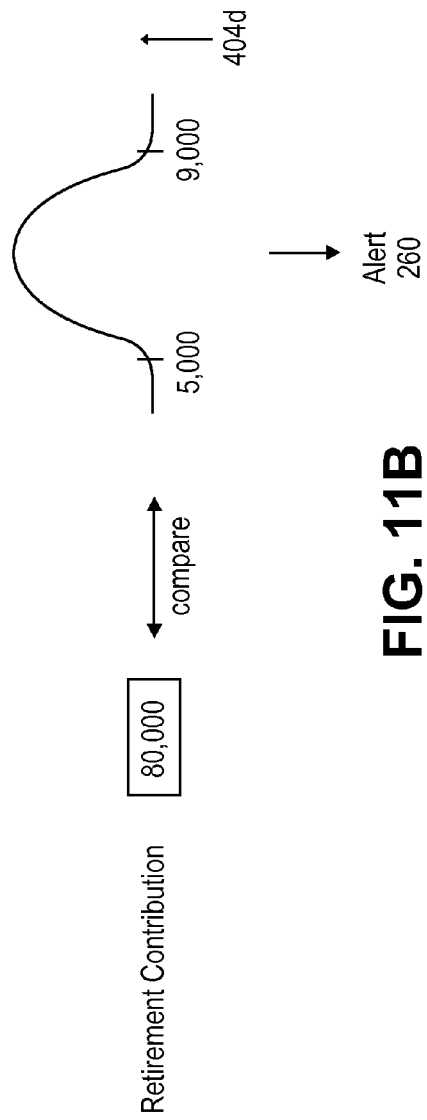

Referring to FIGS. 11A-B a similar analysis can be performed on the retirement contribution. Referring to FIG. 11A, if the retirement contribution is $8,000, then this falls within the selected statistical range of 5,000 to 9,000 such that this retirement contribution is not suspect or questionable, and no alert 260 or other action is initiated by the tax data analysis program 216. Thus, the analysis is transparent to the preparer 215.

However, as shown in FIG. 11B, if the retirement contribution amount 404d entered is $80,000 (e.g. due to a typographical or keyboard malfunction), then this falls outside of the selected range of 5,000 to 9,000 such that this retirement contribution amount 404d is determined by the tax data analysis program 126 to be suspect data 123s. In this case, the tax data analysis program 126 may generate a pop-up window message 902 (as described with reference to FIG. 9C) or highlight or emphasize 1002 the field 414d containing the suspect data 123 (as described with reference to FIG. 10C) to alert the preparer of the suspect data 123s.

Figure 12:
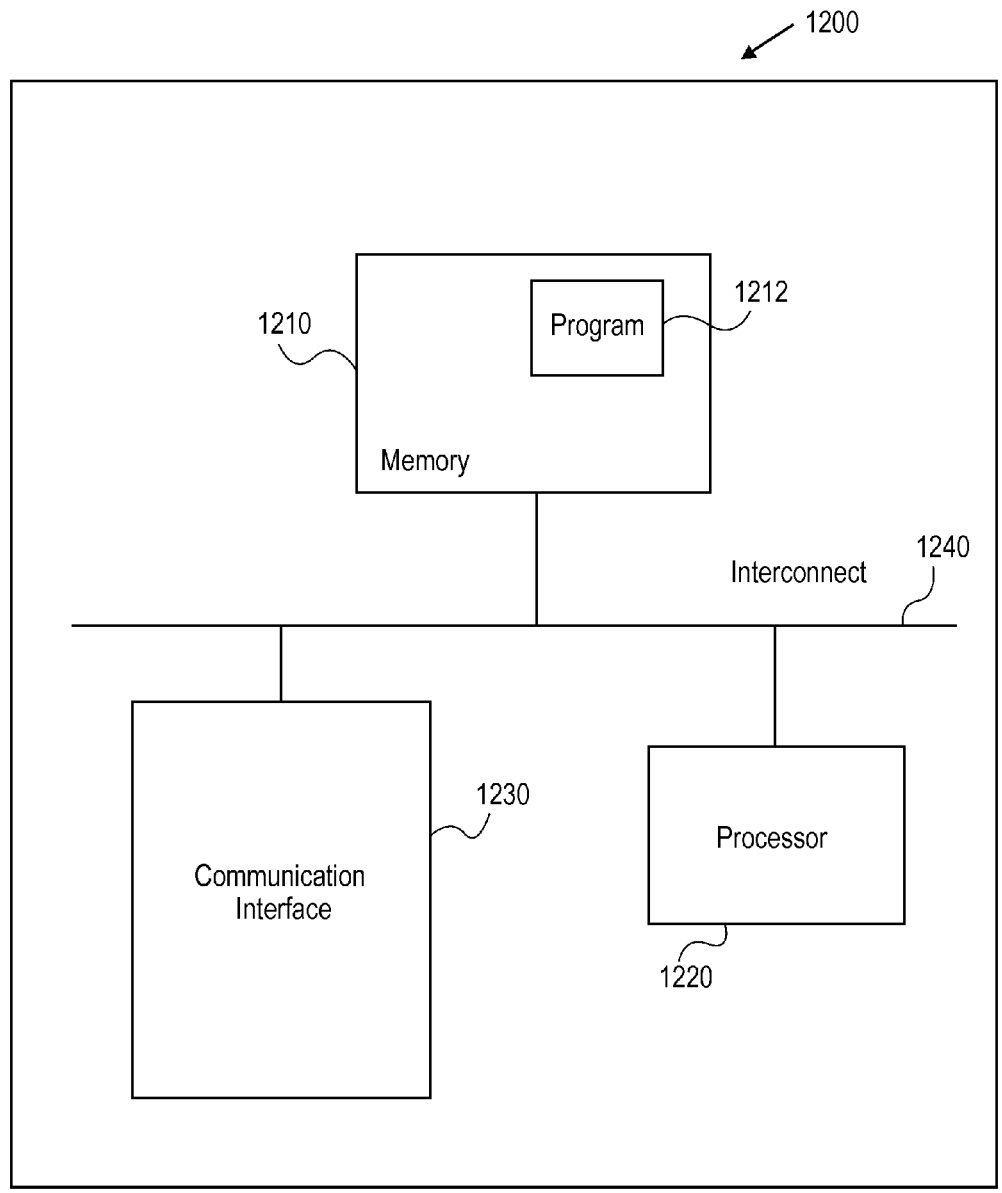
FIG. 12 is a block diagram of components of a computing apparatus or system in which various embodiments may be implemented or that may be utilized to execute various embodiments.
Figure 13A:

FIG. 12 generally illustrates components of a computing device 1200 that may be utilized to execute embodiments and that includes a memory 1210, account processing program instructions 1212, a processor or controller 1220 to execute account processing program instructions 1212, a network or communications interface 1230, e.g., for communications with a network or interconnect 1240 between such components. The memory 1210 may be or include one or more of cache, RAM, ROM, SRAM, DRAM, RDRAM, EEPROM and other types of volatile or non-volatile memory capable of storing data. The processor unit 1220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1240 may include a system bus, LDT, PCI, ISA, or other types of buses, and the communications or network interface may, for example, be an Ethernet interface, a Frame Relay interface, or other interface. The network interface 1230 may be configured to enable a system component to communicate with other system components across a network which may be a wireless or various other networks. It should be noted that one or more components of computing device 1200 may be located remotely and accessed via a network. Accordingly, the system configuration provided in FIG. 12 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1220 performs steps or executes program instructions 1212 within memory 1210 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments described above involve entry of a type of income, e.g., AGI, and selection of statistics of types of deductions, e.g., charitable contributions, mortgage interest and retirement contributions, embodiments may also involve entry of a first type of income and selection of statistics of other types of income (e.g., interest income, dividend income, rental income, etc.) so that data of these other types of income can be compared to statistics selected based upon the first type of income. Further, embodiments may also involve entry of a first type of deduction and selection of statistics of other types of deductions so that data of these other types of deductions can be compared to statistics selected based upon the first type of deduction. Further, embodiments may also involve entry of a first type of income and selection of statistics of at least one other type of income and at least one type of deduction so that data of these at least one type of income and deduction can be compared to statistics selected based upon the first type of income. Additionally, embodiments may also involve entry of a first type of deduction and selection of statistics of at least one other type of income and at least one type of deduction so that data of these at least one type of income and deduction can be compared to statistics selected based upon the first type of deduction. Further, embodiments may involve analysis of data within the same or different interview screens and within the same or different forms as the type of data that was utilized to select statistics. Further, the type of data that is utilized to select statistics of other types of data may be in various sections of an electronic tax return including the beginning, middle and end portions of the electronic tax return. Embodiments may also involve tax credits and other types or categories of data and combinations of two or more of income, deductions and tax credits.

Moreover, while embodiments are described with reference to financial documents including electronic tax returns, embodiments may also involve other electronic financial documents of business or corporate entities that are utilized in financial calculations, which may or may not include tax calculations. For example, a "corporate or business entity" may be a US or foreign corporate or business entities such as Inc./Corp., LC, LLC, PLLC, S, PC, LP, LLP, LLLP, sole proprietorship, non-profits, etc., and embodiments may apply to analyze and verify electronic financial data within financial documents including, but not limited to, tax returns, auditor reports, balance sheets, statements of retained earnings, income statements, cash flow statements and other corporate or business electronic financial documents having electronic financial data.

Further, embodiments may be implemented within a tax preparation program, or the tax preparation program and tax data analysis programs may work together.

Additionally, embodiments may involve a type of quantifiable data being linked to one other type of data or multiple types of data of the same or different category.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially. Thus, the particular sequence of method steps is not intended to be limiting and is provided for ease of explanation. For example, upon entry of the first quantifiable numeric tax return data utilized in a tax calculation, statistics related to that data may be retrieved in response to entry of the first data or later upon entry of second data to be analyzed.

Accordingly, embodiments are intended to exemplify alternatives, modifications, and equivalents that may fall within the scope of the claims.

What is claimed is:

1. A computer-implemented method for identifying suspect data of an electronic tax return, the method being performed by a computing apparatus executing a tax preparation program utilized to prepare an electronic tax return, the method comprising:
the computing apparatus receiving first tax data and second tax data and preparing the electronic tax return with the tax preparation program, a first field of the electronic tax return being populated with the first tax data, a second field of the electronic tax return being populated with the second tax data;
the computing apparatus selecting statistical data based at least in part upon the first tax data; and
the computing apparatus determining whether the second tax data is suspect data based at least in part whether the second tax data satisfies pre-determined criteria relative to the selected statistical data.

2. The method of claim 1, the selected statistical data comprising tax data of a plurality of previously filed tax returns.

3. The method of claim 1, the statistical data being selected from a plurality of different sources.

4. The method of claim 1, further comprising:
categorizing the first tax data, the first tax data being associated with a first category;
categorizing the second tax data, the second tax data being associated with a second category,
wherein statistical data of the second category is selected based at least in part upon the first tax data of the first category, and the second tax data and the selected statistical data of the second category are compared to determine whether the second tax data is suspect data.

5. The method of claim 4, one of the first and second tax data being related to income, and the other of the first and second tax data being related to a deduction.

6. The method of claim 5, the first tax data being selected from the group consisting of an amount of gross income, net income, investment income, rental income, and retirement income.

7. The method of claim 5, the first tax data being selected from the group consisting of an amount of a deduction for real estate, a deduction for a dependent, a deduction for a charitable donation, a deduction for an education expense, a deduction for a medical expense, and a deduction for a retirement plan contribution.

8. The method of claim 1, the pre-determined criteria comprising whether the second tax data is within a range defined by a minimum statistical value and a maximum statistical value of the selected statistical data.

9. The method of claim 8, wherein a determination that the second tax data is suspect data is based at least in part upon the second tax data being outside of a range defined by the minimum statistical value and the maximum statistical value.

10. The method of claim 8, wherein a determination that the second tax data is suspect data is based at least in part upon the second tax data being outside of a pre-determined standard deviation of a mean or average of the selected statistical data.

11. The method of claim 1, wherein a determination is made that the second tax data is suspect data, the method further comprising alerting a preparer of the electronic tax return of the suspect data during preparation of the electronic tax return.

12. The method of claim 11, the alert comprising
a message displayed on a screen of the computing apparatus utilized to prepare the electronic tax return, or
the field in which the suspect data was entered being highlighted or identified.

13. The method of claim 11, the alert being displayed in real time in response to manual input of the second data by the user.

14. The method of claim 11, the alert being displayed before the electronic tax return is completed.

15. The method of claim 11, further comprising:
selecting tax return statistics based at least in part upon first tax data and second tax data entered into the electronic tax return during preparation of the electronic tax return with the tax preparation application;
determining whether third tax data satisfies pre-determined criteria with respect to the selected tax return statistics; and
alerting the preparer of the electronic tax return when the third tax data does not satisfy the pre-determined criteria.

16. The method of claim 1, the selected statistical data comprising tax data collected by a tax authority with which the electronic tax return will be filed.

17. The method of claim 1, the selected statistical data comprising tax data stored at a remote database and utilized by the tax preparation program.

18. The method of claim 1, the computing apparatus determining whether the second tax data is suspect data before the electronic tax return is completed and filed with a tax authority.

19. The method of claim 1, at least one of the first data and the second data being a numerical result of a tax calculation performed by the tax preparation program.

20. The method of claim 1, further comprising:
receiving third tax data during preparation of the electronic tax return, wherein statistical data is selected based at least in part upon at least one of the first tax data and the second tax data; and
determining whether the third tax data is suspect data based at least in part whether the third tax data satisfies pre-determined criteria relative to the selected statistical data.

21. The method of claim 1, wherein respective statistical data are selected based at least in part upon the first tax data for determining whether the second tax data and at least one other type or category of tax data associated with the first tax data satisfy respective pre-determined criteria.

22. The method of claim 1, the second tax data being selected from the group consisting of an amount of a deduction for real estate, a deduction for a dependent, a deduction for a charitable donation, a deduction for an education expense, a deduction for a medical expense, and a deduction for a retirement plan contribution.

23. The method of claim 1, the second tax data being selected from the group consisting of an amount of gross income, net income, investment income, rental income, and retirement income.

24. A computer-implemented method for identifying suspect data of an electronic tax return, the method being performed by a computing apparatus executing a tax preparation application utilized to prepare an electronic tax return, the method comprising:
the computing apparatus preparing the electronic tax return with the tax preparation program;
the computing apparatus selecting tax return statistics based at least in part upon first tax data entered into the electronic tax return;
the computing apparatus determining whether second tax data satisfies pre-determined criteria with respect to the selected tax return statistics; and
the computing apparatus alerting a preparer of the electronic tax return during preparation of the electronic tax return when the second tax data does not satisfy the pre-determined criteria.

25. The method of claim 24, further comprising:
categorizing the first tax data, the first tax data being associated with a first category;
categorizing the second tax data, the second tax data being associated with a second category,
wherein statistical data of the second category is selected based at least in part upon the first tax data of the first category, and the second tax data and the selected statistical data of the second category are compared to determine whether the second tax data is suspect data.

26. The method of claim 24, the pre-determined criteria comprising whether the second tax data is within a range defined by a minimum statistical value and a maximum statistical value of the selected statistical data.

27. The method of claim 24, wherein the preparer is alerted when the second tax data is outside of a range defined by the minimum statistical value and the maximum statistical value.

28. The method of claim 24, wherein the preparer is alerted when the second tax data is outside of a pre-determined standard deviation of a mean or average of the selected statistical data.

29. The method of claim 24, the alert comprising
a message displayed on a screen of the computing apparatus utilized to prepare the electronic tax return, or
the field in which the suspect data was entered being highlighted or identified.

30. The method of claim 24, the alert being displayed in real time in response to manual input of the second data by the user.

31. The method of claim 24, the alert being displayed before the electronic tax return is completed.

32. The method of claim 24, the preparer being alerted before the electronic tax return is completed and filed with a tax authority.

33. The method of claim 24, at least one of the first data and the second data being a numerical result of a tax calculation performed by the tax preparation program.

34. The method of claim 24, wherein respective statistical data are selected based at least in part upon the first tax data for determining whether the second tax data and at least one other type or category of tax data associated with the first tax data satisfy respective pre-determined criteria.

35. A computer-implemented method for identifying suspect data within an electronic financial document of a corporate or business entity, the method being performed by a computing apparatus executing a program utilized to generate the electronic financial document, the method comprising:

the computing apparatus receiving first financial data and second financial data and preparing the electronic financial document with the program, a first field of the electronic financial document being populated with the first financial data, a second field of the electronic financial document being populated with the second financial data;

the computing apparatus selecting statistical data based at least in part upon the first financial data; and the computing apparatus determining whether the second financial data is suspect data based at least in part upon whether the second financial data satisfies pre-determined criteria relative to the selected statistical data.

36. The method of claim 35, wherein the electronic financial document is a corporate quarterly statement.

37. The method of claim 35, wherein the electronic financial document is an annual report.

* * * * *